US007268660B2

(12) United States Patent
Bolda et al.

(10) Patent No.: US 7,268,660 B2
(45) Date of Patent: Sep. 11, 2007

(54) LOW BATTERY INDICATOR

(75) Inventors: Gerry Bolda, Victoria (CA); Paul Johnston, Victoria (CA); Jordon Reynolds, Vancouver (CA)

(73) Assignee: Contech Electronics Ioc., Victoria, B.C. (CA)

( * ) Notice: Subject to any disclaimer, the term of this patent is extended or adjusted under 35 U.S.C. 154(b) by 173 days.

(21) Appl. No.: 10/933,885

(22) Filed: Sep. 3, 2004

(65) Prior Publication Data

US 2006/0049910 A1    Mar. 9, 2006

(51) Int. Cl.
   H01H 37/08   (2006.01)
   H01H 37/50   (2006.01)
   G01K 5/60    (2006.01)
   H01M 10/48   (2006.01)
   G08B 5/32    (2006.01)

(52) U.S. Cl. ............... 337/140; 337/139; 320/150; 116/216; 429/92; 340/636.18

(58) Field of Classification Search ............... 337/36, 337/37, 52, 55, 56, 66, 70, 79, 139, 140; 320/132, 154, DIG. 21, 134, 150; 116/221, 116/216; 429/62, 92, 93; 340/636.1, 636.18
See application file for complete search history.

(56) References Cited

U.S. PATENT DOCUMENTS 5,053,752 A * 10/1991 Epstein et al. ............... 340/628
5,365,221 A * 11/1994 Fennell et al. ........ 340/636.15
5,629,662 A    5/1997 Floyd et al.
6,441,746 B1   8/2002 Taborisskiy et al.
6,563,414 B2 *  5/2003 Yu ............................... 337/66
6,704,615 B1   3/2004 Veenstra et al.

* cited by examiner

*Primary Examiner*—Anatoly Vortman

(57) ABSTRACT

A low battery indicating device is disclosed for indicating that a battery has low power. The device includes an indicator having a body movable between a retracted, unactuated position and an extended, actuated position. The indicator is visible when in the actuated position. The device also includes means for biasing the indicator towards the actuated position, and latch means cooperating with a portion of the body of the indicator, when the latch means is in a stop position, to hold the indicator in its unactuated position. The latch means is movable between the stop position and a go position which frees the indicator to move, under operation of the biasing means, to the actuated position. A memory alloy wire is mechanically associated with the latch means so as to leave the latch means in the stop position when the memory alloy wire is in a relaxed state and to move the latch means to the go position when the memory alloy wire is in a contracted state caused by heating of the memory alloy wire. Electrical sensor circuitry is in communication with the memory alloy wire. The electrical sensor circuitry is adapted to detect when the battery means has low power and cause heating of the memory alloy wire to cause it to change to the contracted state and thereby move the latch means to the go position.

21 Claims, 2 Drawing Sheets

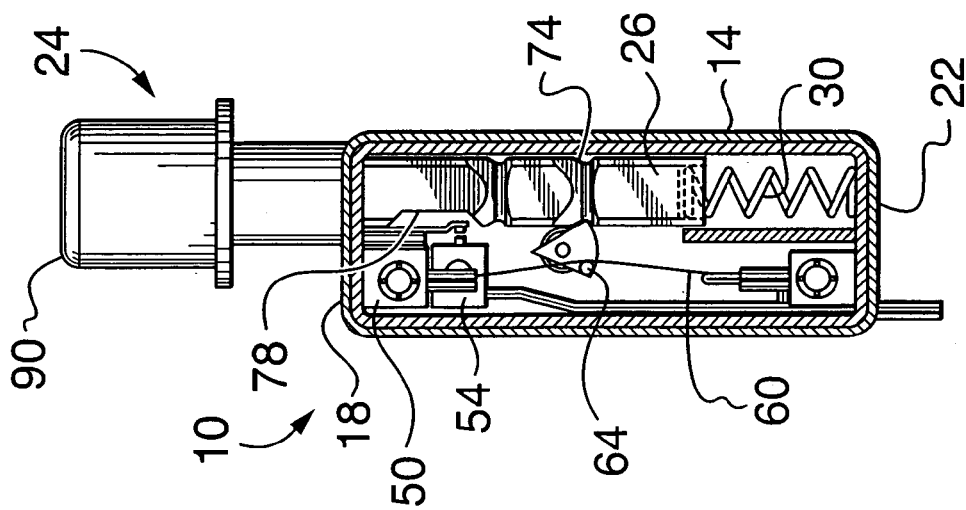
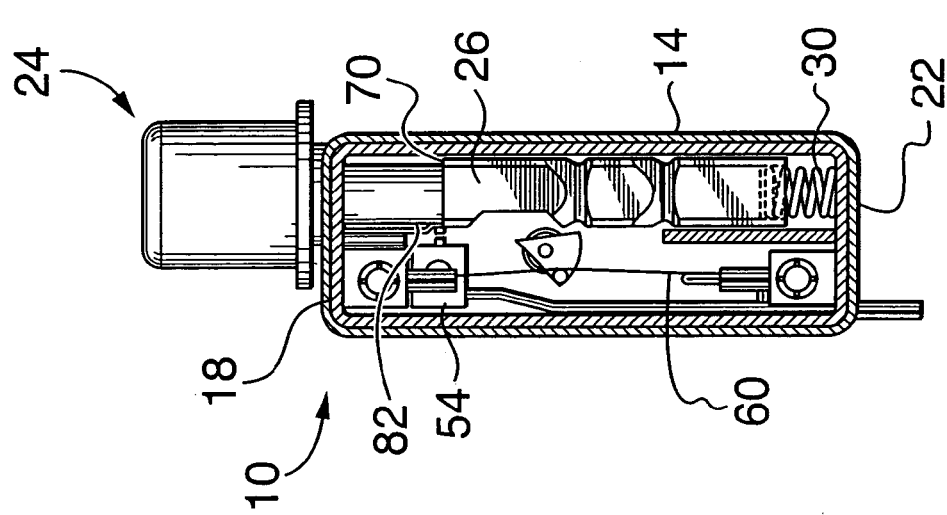
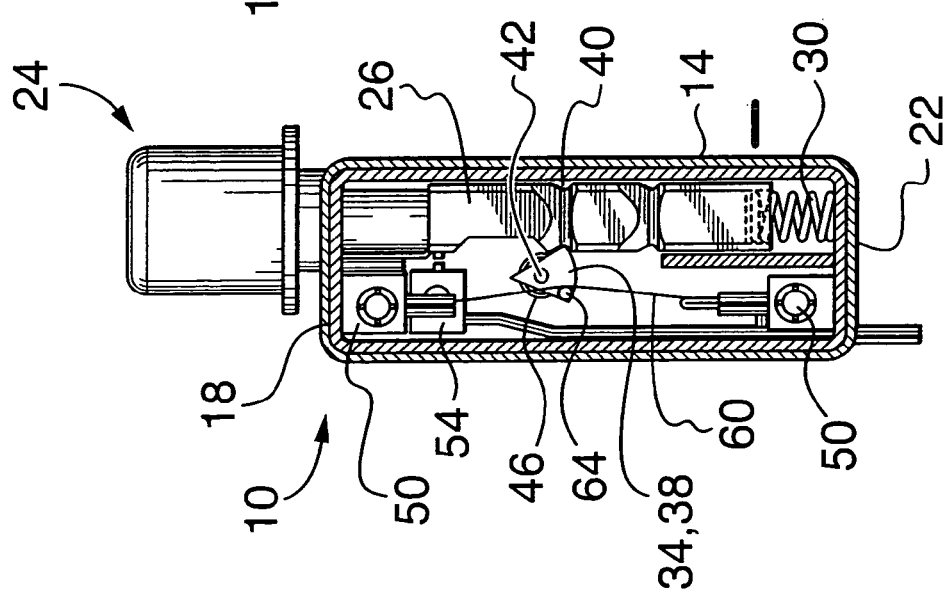

LOW BATTERY INDICATOR

FIELD OF THE INVENTION

The present invention relates to low battery indicators and, in particular, a low battery indicating device having minimal energy consumption.

BACKGROUND OF THE INVENTION

It is known to use shape memory alloy wire (SMA wire) in association with latch-based mechanisms. Memory alloy wire (or muscle wire) has a unique property in that it will contract (e.g. 4% in length) when it is heated. When used in a latch mechanism, the muscle wire is hooked onto or attached to the latch. When the muscle wire is in its expanded state, the latch can be engaged, and when the muscle wire is in a contracted state, the latch can be disengaged.

U.S. Pat. No. 5,629,662 of Floyd et al. issued May 13, 1997 discloses a low energy memory metal actuated latch (low energy here being in reference to a small amount of energy which needs to be supplied to the memory alloy wire). The patent describes the use of a memory metal actuator including a length of memory wire, in a system for interrupting current flow in a circuit breaker. The actuator is connected to a latch system which enters a release state when the memory wire contracts following receipt of energy. A plunger associated with the latch system is displaceable by stored energy in a spring.

U.S. Pat. No. 6,441,746 of Taborisskiy et al. issued Aug. 27, 2002 teaches an actuating mechanism for a gauge pointer. A muscle wire driven rack gear is operatively connected to a rotatable pointer gear. The rack gear is biased to a gauge at-rest position by a spring member. Upon receiving an electrical signal from a vehicle sensor, the muscle wire contracts, moving the rack member against the spring force to drive the gauge pointer to an appropriate reading on a gauge face. The actuating mechanism of this patent requires current to continually flow through the muscle wire. This consumes more energy than an actuating mechanism which only requires a one time pulse of current through the muscle wire.

U.S. Pat. No. 6,704,615 of Veenstra et al. issued Mar. 9, 2004 describes an object dispenser that includes latchable and unlatchable retainers. The latch mechanism disclosed in this patent includes an SMA wire and a latch pin associated with a spring. In operation, the latch mechanism unlatches a retainer by a latch pin pulling away from a latch edge of the retainer. Retraction of the latch pin is caused by contraction of the SMA wire, which is attached to the latch pin at one end.

Low battery indicators found in low cost consumer electronics are usually in the form of an audio or visible signal such as a speaker or light. The disadvantage of these indicators is that they consume significant amounts of power, continuously from the batteries being checked, just at the time when power needs to be conserved. It is possible to add a low power display such as an LCD panel, but adding one simply to display battery status would add significant complexity and cost to the device.

It is an object of the present invention to provide an improved low battery indicator.

SUMMARY OF THE INVENTION

According to one aspect of the invention, there is provided a device for indicating that a battery has low power. The device comprises an indicator having a body movable between a retracted, unactuated position and an extended, actuated position. The indicator is visible when in the actuated position. The device also comprises means for biasing the indicator towards the actuated position, and latch means cooperating with a portion of the body of the indicator, when the latch means is in a stop position, to hold the indicator in its unactuated position. The latch means is movable between the stop position and a go position which frees the indicator to move, under urging of the biasing means, to the actuated position. A memory alloy wire is mechanically associated with the latch means so as to leave the latch means in the stop position when the memory alloy wire is in a relaxed state and to move the latch means to the go position when the memory alloy wire is in a contracted state caused by heating of the memory alloy wire. Electrical sensor circuitry is provided in communication with the memory alloy wire. The electrical sensor circuitry is adapted to detect when the battery has low power and then cause current flow through the memory alloy wire to heat that wire and cause it to change to the contracted state and thereby move the latch means to the go position.

In a preferred embodiment, the indicating device further comprises two wire attachment terminals. The terminals have the memory alloy wire secured and electrically connected to them, and the memory alloy wire extends between the attachment terminals.

The low battery indicating device according to the present invention requires very little energy from the battery to operate, and therefore the device can conserve the battery at a time when this is important.

The low battery indicating device according to the present invention uses energy from the battery during actuation for only a short period of time, and therefore the device does not need to continually drain the battery.

BRIEF DESCRIPTION OF THE DRAWINGS

These and other advantages of the invention will become apparent upon reading the following detailed description and upon referring to the drawings in which:—

FIG. 1 is a diagrammatic vertical section view taken through an embodiment of a low battery indicating device, according to the present invention, a latch maintaining an indicator in a retracted position;

FIG. 2 is another diagrammatic vertical section view of the indicating device of FIG. 1 illustrating the latch in a position such that the indicator is free to move;

FIG. 3 is yet another diagrammatic vertical section view of the indicating device of FIG. 1 illustrating the indicator in an extended position.

Figure 4A:
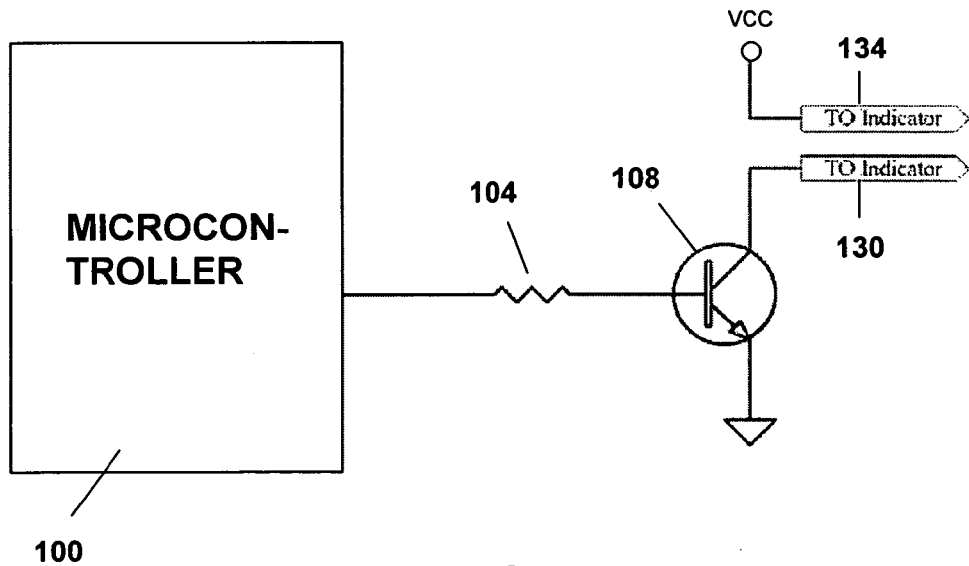
FIGS. 4a and 4b are schematic diagrams of electrical sensor circuitry for the low battery indicating device according to the present invention, adapted to detect when battery has low power and actuate the indicator.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to FIG. 1, there is illustrated an indicating device 10 for indicating that a battery (not illustrated) has low power. The device 10 is not intended to be used on its own, but rather it is integrated into a device (such as a consumer electronics device) including the battery. Most of the components of the device 10 are contained within a housing 14. The housing 14 includes a top wall 18 and a bottom wall 22. The housing 14 is preferably made of plastic or any other suitable conventional material.

Indicator 24, situated outside of housing 14, has an elongated body 26 which extends between the walls 18 and 22. A portion of the body 26 also extends through an aperture in the top wall 18. The indicator 24 is preferably made of plastic; however, it can also be made of other suitable materials.

When the indicator 24 is in a retracted position as illustrated in FIG. 1, there is stored potential energy associated with the indicator 24. More specifically, the potential energy is in a coil spring 30. The coil spring 30 provides means for biasing the indicator 24 towards an extended position which is illustrated in FIG. 3 (i.e. the coil spring 30 urges the indicator 24 to move upwardly).

The indicator 24 cannot however normally move upwardly because it is held in an unactuated position by latch or latch means 34. The latch 34 cooperates with a centrally located portion of the body 26. More specifically, the latch 34 engages an upper notch 40 on the body 26.

The latch 34 includes a sector shaped latch member 38, a short shaft 42 and a torsional spring 46. The latch member 38 is mounted on the short shaft 42 for rotational motion thereon. The latch member 38 is also biased to rotate in a counter clockwise direction, because the torsional spring 46 exerts a torque on it in that direction. The shape of the latch member 38 is not essential. For example, the latch member 38 could be triangular shaped.

Adjacent each of the walls 18 and 22 are battery terminals 50 which are also wire attachment terminals because they are adapted to permit a wire to be attached to them. The terminals 50 are connected to a direct current voltage source. In one particular embodiment, the voltage source is the battery being checked. If the voltage source is a battery, one of the terminals 50 would be connected to the battery's positive terminal and the other terminal 50 would be connected to the battery's negative terminal. Associated with the upper terminal 50 is a switch 54 for selectively permitting or preventing current flow through the upper terminal 50.

Extending between the terminals 50 is an SMA wire or muscle wire 60. One particular SMA wire that can be used is Nitinol. The muscle wire 60 is secured and electrically connected to the terminals 50. Muscle wire 60 also runs across a protrusion 64 on the latch member 38 at a point substantially equidistant between the two terminals 50. This setup permits the muscle wire 60 to transmit torque to the latch member 38.

FIG. 1 illustrates the latch 34 in a stop position and the muscle wire 60 in a relaxed state. In the stop position, the latch 34 holds the body 26 so that the indicator 24 is kept in an unactuated position. By contrast, FIG. 2 illustrates the latch 34 in a go position and the muscle wire 60 in a contracted state. When the latch 34 is in a go position, the indicator 24 is free to move (under urging of coil spring 30) to an actuated position. In FIG. 2, muscle wire 60 has contracted and this contraction, by a pulling action on the protrusion 64, has caused a change in rotational position of the latch member 38 by clockwise rotation, and also movement of the latch 34 from the stop position to the go position. In other words, the latch member 38 moves away from the stop position because the muscle wire 60 exerts an opposing torque on the latch member 38 which is greater than the torque exerted by the torsional spring 46.

As previously explained, muscle wire contracts when it is heated. In the illustrated embodiment, the muscle wire 60 is heated by passing current through it. More specifically, current is directed through the circuit path between the terminals 50. This is done when electrical sensor circuitry (illustrated in FIGS. 4a and 4b) of the indicating device 10 detects that the battery being monitored has low power. Thus, upon low battery power being detected, current is passed through the muscle wire 60, which then becomes heated and contracted, causing clockwise rotation of the latch member 38, with the result being the unlatching of the latch 34 by its movement to go position.

Once the latch 34 is in the go position illustrated in FIG. 2, the indicator 24 is no longer latched. This is because the latch member 38 is no longer holding the body 26 because it has moved out of the notch 40. Because the indicator 24 is no longer latched, the indicator 24 will now move upwardly to the extended position illustrated in FIG. 3.

In moving from the position illustrated in FIG. 2 to the position illustrated in FIG. 3, the body 26 pops upwardly until an abutment 70 hits the upper wall 18. It is noted that both the upper notch 40 and a lower notch 74 are shaped to cooperate in a detent manner with the latch member 38 against the bias of spring 30. The upper notch 40 is constructed so as to permit latching the indicator 24 in the retracted position. The lower notch 74 is constructed so as to cause the muscle wire 60 to be stretched back to its original length by means of the forsional spring 46 which urges counterclockwise rotation of the latch member 38.

It is understood that the coil spring 30 is in contact with the lower wall 22 regardless of whether the indicator 24 is in a retracted or in an extended position. There is an aperture in the base of the body 26. This aperture has a diameter larger than that of the coil spring 30 permitting the spring 30 to telescope within the body 26.

The body 26 has yet another notch 78 above the notches 40 and 74. In FIG. 2, switch arm 82 (best seen in FIG. 3) is in contact with an adjacent portion of the switch 54, and therefore the switch 54 is in a closed state permitting current flow. In FIG. 3, the body 26 has moved upwardly to a position wherein the notch 78 is adjacent to the arm 82. The arm 82 therefore moves away from the adjacent switch portion resulting in the switch 54 being in an open state.

When the switch 54 is open as illustrated in FIG. 3, current will not flow through the muscle wire 60. Thus, even though the electrical sensor circuitry associated with the terminals 50 may be continuing to detect a low battery condition, the muscle wire 60 will not have current flowing through it. In this way, the indicator 24 operates in a manner such that only a small amount of electrical energy in a one time application is required.

Figure 4B:
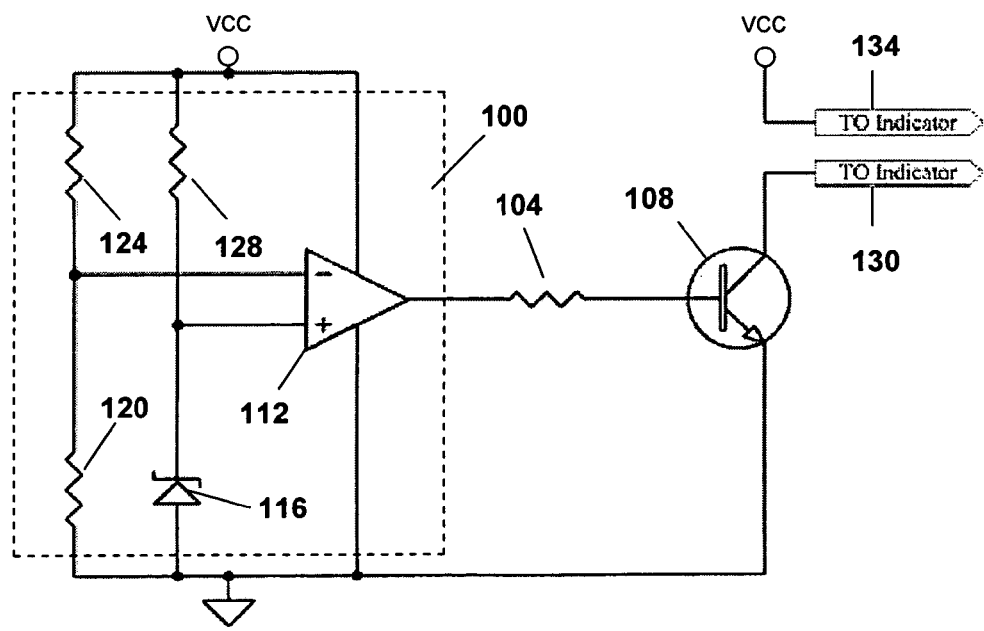

FIGS. 4a and 4b illustrate electrical sensor circuitry that is suitable for detecting when the battery means being monitored has low power. The electrical sensor circuitry includes a microcontroller 100, a resistor 104 and an npn transistor 108. The microcontroller 100 includes an op/amp 112, a zener diode 116, and resistors 120, 124 and 128. The values of these components will vary, and one skilled in the art of electronic circuit design can easily modify the circuit as necessary for different battery means supplying Vcc. Furthermore, it is possible to build the desired electrical sensor circuitry using various alternative circuit components and layouts known to those skilled in the art.

Connection means 130 electrically connects the collector of the transistor 108 to one end of the muscle wire 60. The muscle wire 60 will not have current flowing through it unless the transistor 108 is in a state permitting current flow through its collector. Connection means 134 electrically connects Vcc to the other end of the muscle wire.

Vcc is related to the battery means being monitored. When the battery means has low power, Vcc will be below a certain threshold. When Vcc is below a certain threshold, current flow through the collector of the transistor 108 is possible. When the battery means has normal power, Vcc will be above a certain threshold. When Vcc is above a certain threshold, current will not flow through the collector of the transistor 108.

The indicating device 10 is straightforward to use. As discussed, when it is detected that a battery means has low power, the indicator 24 will move from the retracted, unactuated position to the extended, actuated-position. An individual will see that the indicator 24 is in its extended position, and will recognize that a battery or batteries need to be replaced.

Recognizing that one or more batteries need to be changed, the individual will proceed to do this. After this has been done, it is a simple matter to reset the indicating device back to a retracted position. The individual simply depresses button 90 which is on the upper end of the indicator 24. As the indicator 24 is depressed, the indicating device goes from the state illustrated in FIG. 3 back to the state illustrated in FIG. 1. This is possible because sufficient downward force on the button 90 can push the latch member 38 out of the notch 74. After the indicating device 10 is reset, the body 26 is still engaged by the latch 34; however, the latch 34 now engages the upper notch 40 instead of the lower notch 74.

It is possible that someone could depress the button 90, but have forgotten to change the battery(s) prior to doing this. In this case, the indicator 24 will return to the extended position after a very short period of time. Alternatively the device 10 could be modified to have the indicator 24 return to the extended position after some time has elapsed (e.g. 30 seconds).

It will be appreciated by one skilled in the art that the indicating device 10 can be constructed so that the indicator 24 automatically resets itself once the batteries have been replaced. This would of course require modifications to the sensor circuitry, and possibly also require changes related to the manner in which the muscle wire 60 operates.

While it is preferable to have current flow through the muscle wire 60 only as needed (i.e. when rotation of the latch 34 is required) the indicating device 10 could be constructed in a manner such that current passes through the muscle wire 60 over longer periods of time. This would of course result in a higher consumption of energy associated with the indicating device 10.

The muscle wire 60 and its associated circuitry are relatively low cost and low power; however other latch release mechanisms are possible. An example would be a bi-metal strip or an electromagnet based latch release mechanism.

It will be appreciated by one skilled in the art that an additional low battery indication means could be combined with the indication means provided by the indicator 24. For example, a short beep could be sounded upon detection of low battery power.

Thus, it is apparent that there has been provided in accordance with the invention a low battery indicator that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. A device for indicating that a battery has low power, the device comprising:

(a) an indicator having a body movable between a retracted, unactuated position and an extended, actuated position, the indicator being visible when in said actuated position;

(b) means for biasing the indicator towards said actuated position;

(c) latch means cooperating with a portion of the body of the indicator, when the latch means is in a stop position, to hold the indicator in its unactuated position, the latch means movable between said stop position and a go position which frees the indicator to move, under urging of said biasing means, to said actuated position;

(d) a memory alloy wire mechanically associated with the latch means so as to leave the latch means in said stop position when the memory alloy wire is in a relaxed state and to move the latch means to said go position when the memory alloy wire is in a contracted state caused by heating of the memory alloy wire;

(e) electrical sensor circuitry in communication with the memory alloy wire, said electrical sensor circuitry adapted to detect when said battery has low power and then cause current flow through said memory alloy wire to heat said memory alloy wire and cause it to change to said contracted state and thereby move the latch means to said go position; and (f) two wire attachment terminals, said terminals having said memory alloy wire secured and electrically connected to them, and wherein said memory alloy wire extends between said attachment terminals, wherein said memory alloy wire is in contact with said latch means at a point between the two terminals, wherein said latch means comprises a rotatable latch member having a protrusion formed thereon, said memory alloy wire running across said protrusion so that said memory alloy wire, when changing to its contracted state, causes a change in rotational position of the latch means by pulling on said protrusion, causing rotation of said latch member, wherein said latch means further comprises a spring exerting a biasing torque against said latch member to urge it rotationally towards said stop position, and said memory alloy wire in contracted state is constructed so as to exert greater and opposing torque on said latch member in order to cause rotation of said latch member from said stop position to said go position, wherein said body of the indicator is elongated and has at least one notch, the notch being shaped to cooperate in a detent manner with said latch member, and wherein said body of the indicator has two notches, said notches being shaped to cooperate in a detent manner with said latch member, one of said notches being constructed so as to permit latching said indicator in said retracted position, and the other of said notches being constructed so as to permit latching said indicator in said extended position.

2. An indicating device according to claim 1, wherein said memory alloy wire is in contact with said latch means at a point substantially equidistant between the two terminals.

3. An indicating device according to claim 1, wherein said latch member is sector shaped.

4. An indicating device according to claim 1 further comprising a switch having open and closed states, the switch to control current flow through said memory alloy wire.

5. An indicating device according to claim 4, wherein when said indicator is in said retracted position, said switch is in the closed state, and when said indicator is in said extended position, said switch is in the open state so that said path does not have current flowing through it so as to avoid unnecessary energy consumption.

6. An indicating device according to claim 1, wherein said battery provides energy needed for heating of the memory alloy wire.

7. An indicating device according to claim 6, wherein said memory alloy wire is Nitinol.

8. An indicating device according to claim 1, wherein said indicator is constructed so as to be depressible to move from said actuated position to said unactuated position in order to reset the device in a retracted position.

9. A device for indicating that a battery has low power, the device comprising:
(a) an indicator having a body movable between a retracted, unactuated position and an extended, actuated position, the indicator being visible when in said actuated position;
(b) means for biasing the indicator towards said actuated position;
(c) latch means cooperating with a portion of the body of the indicator, when the latch means is in a stop position, to hold the indicator in its unactuated position, the latch means movable between said stop position and a go position which frees the indicator to move, under urging of said biasing means, to said actuated position;
(d) a memory alloy wire mechanically associated with the latch means so as to leave the latch means in said stop position when the memory alloy wire is in a relaxed state and to move the latch means to said go position when the memory alloy wire is in a contracted state caused by heating of the memory alloy wire;
(e) electrical sensor circuitry in communication with the memory alloy wire, said electrical sensor circuitry adapted to detect when said battery has low power and then cause current flow through said memory alloy wire to heat said memory alloy wire and cause it to change to said contracted state and thereby move the latch means to said go position;
(f) two wire attachment terminals, said terminals having said memory alloy wire secured and electrically connected to them, and wherein said memory alloy wire extends between said attachment terminals; and
a switch having open and closed states, the switch to control current flow through said memory alloy wire, wherein said switch is configured to be in a closed condition when the latch means is in the stop position, and is in an open condition when the actuator is in its actuated position.

10. An indicating device according to claim 9, wherein said memory alloy wire is in contact with said latch means at a point between the two terminals.

11. An indicating device according to claim 9, wherein said memory alloy wire is in contact with said latch means at a point substantially equidistant between the two terminals.

12. An indicating device according to claim 10, wherein said latch means comprises a rotatable latch member having a protrusion formed thereon, said memory alloy wire running across said protrusion so that said memory alloy wire, when changing to its contracted state, causes a change in rotational position of the latch means by pulling on said protrusion, causing rotation of said latch member.

13. An indicating device according to claim 12, wherein said latch means further comprises a spring exerting a biasing torque against said latch member to urge it rotationally towards said stop position, and said memory alloy wire in contracted state is constructed so as to exert greater and opposing torque on said latch member in order to cause rotation of said latch member from said stop position to said go position.

14. An indicating device according to claim 13, wherein said latch member is sector shaped.

15. An indicating device according to claim 13, wherein said body of the indicator is elongated and has at least one notch, the notch being shaped to cooperate in a detent manner with said latch member.

16. An indicating device according to claim 15, wherein said body of the indicator has two notches, said notches being shaped to cooperate in a detent manner with said latch member, one of said notches being constructed so as to permit latching said indicator in said retracted position, and the other of said notches being constructed so as to permit latching said indicator in said extended position.

17. An indicating device according to claim 9, wherein when said indicator is in said retracted position, said switch is in the closed state, and when said indicator is in said extended position, said switch is in the open state so that said path does not have current flowing through it so as to avoid unnecessary energy consumption.

18. An indicating device according to claim 9, wherein said battery provides energy needed for heating of the memory alloy wire.

19. An indicating device according to claim 18, wherein said memory alloy wire is Nitinol.

20. An indicating device according to claim 16, wherein said indicator is constructed so as to be depressible to move from said actuated position to said unactuated position in order to reset the device in a retracted position.

21. An indicating device according to claim 20, wherein said latch member is sector shaped.

* * * * *